United States Patent [19]

Zucker

[11] Patent Number: 5,550,800
[45] Date of Patent: Aug. 27, 1996

[54] PICK-UP WITH ADAPTATION

[75] Inventor: Friedhelm Zucker, Villingen-Schwenningen, Germany

[73] Assignee: Deutsche Thomson-Brandt GmbH, Villigen-Schwenningen, Germany

[21] Appl. No.: 432,446

[22] Filed: May 1, 1995

[30] Foreign Application Priority Data

May 3, 1994 [DE] Germany .................. 44 15 508.5

[51] Int. Cl.[6] .................................................. G11B 7/00
[52] U.S. Cl. .................... 369/116; 369/54; 369/106; 369/44.25; 369/44.35; 369/58
[58] Field of Search ............................ 369/116, 106, 369/110, 124, 54, 58, 44.25, 44.29, 44.35

[56] References Cited

U.S. PATENT DOCUMENTS

| | | | |
|---|---|---|---|
| 4,890,273 | 12/1989 | Takeuchi et al. | 369/45 |
| 5,050,156 | 9/1991 | Barton | 369/116 |
| 5,146,449 | 9/1992 | Shimozawa | 369/106 |
| 5,148,423 | 9/1992 | Gleim | 369/44.29 |
| 5,184,343 | 2/1993 | Johann et al. | 369/116 |
| 5,251,199 | 10/1993 | Utsumi et al. | 369/116 |
| 5,483,513 | 1/1996 | Fuji | 369/58 |

FOREIGN PATENT DOCUMENTS

| | | |
|---|---|---|
| 162702B1 | 8/1988 | European Pat. Off. . |
| 195606B1 | 7/1991 | European Pat. Off. . |
| 3602640 | 8/1986 | Germany . |

OTHER PUBLICATIONS

Japanese Abstract, Japanese Patent No.01–39633A, Kazuhiko Nakane, *Method for Driving Recording Medium*, (Mitsubishi Electric Corp.) Sep. 2, 1989.

Japanese Abstract, Japanese Patent No. 01–34739A, Yoshiki Nakajima, *Servo Circuit for Optical Disk Device*, (Mitsubishi Electric Corp.) May 2, 1992.

*Primary Examiner*—Loha Ben
*Attorney, Agent, or Firm*—Joseph S. Tripoli; Eric P. Herrmann; Ronald H. Kurdyla

[57] ABSTRACT

In an optical recording apparatus light is directed to and reflected from a recording medium to recover recorded information. The intensity of direct and reflected light is measured and the ratio of the measured values is used to control the intensity of the light source to maintain the intensity of reflected light substantially constant.

8 Claims, 2 Drawing Sheets

PICK-UP WITH ADAPTATION

The invention relates to a device and process for recorded signal recovery system with adaptation.

BACKGROUND OF THE INVENTION

With a signal recovery transducer, such as for example an optical pick-up, recording media can be read and/or information can be stored on recording media, the quality and quantity of the recording or playback being influenced significantly by the recording medium itself. To compensate for adverse effects of the recording medium during recording and/or playback, a pick-up with adaptation is provided. The recording medium may be an optical recording medium or another type of recording medium in a corresponding recording and/or playback machine. In the case of an optical recording medium, data or information can be stored in so-called pits in, for example, a compact disc (CD) and/or magneto-optical domains in the case of a magneto-optical disc (MOD) or a ROM-RAM or in some other way.

It is generally known that recording media, such as for example optical recording media, have different reflection properties, due to the manner in which they are manufactured, caused by aging or soiling. Since the recording medium is to be regarded as a component part of the machine during the recording or playback of information, both its properties and the properties of the machine influence the quality and quantity of the information recorded and/or played back. This influencing relates in particular to the properties of closed-loop control circuits. If, for example, a different recording medium is loaded into the optical pick-up or if changes occur with regard to the laser power, the amplitude of the signal reflected by the recording or information medium changes and, as a result, the loop gain of control circuits changes. This may have the result that, with excessive loop gain, the stability of the control circuit is lost or, if the control gain is inadequate, the system deviation becomes too great to ensure reliable functioning of the machine during recording and/or playback.

It is therefore the object of the invention to avoid these disadvantages of pick-ups, which consist in particular of the influence on the control loop gain in closed-loop control circuits of the pick-up due to the recording medium.

SUMMARY OF THE INVENTION

For adaptation to the recording medium, the invention provides a means for detecting the ratio of the intensity of an information carrier signal to the pick-up power expended, by which ratio the control loop gain of at least one control circuit of the pick-up is influenced. For this purpose, in the case of an optical pick-up, for example, the light power reflected by the optical recording medium or the intensity of, the reflected light is measured by a photodetector and a ratio with respect to the laser power expended is formed, preferably by a divider, the laser power expended for pick-up being represented by a signal of the monitor diode of the laser.

With this ratio, which represents a measure of the reflectivity of the recording medium, an optimum control gain of the control circuit is then set. For this purpose, the control loop gain is influenced reciprocally with respect to the reflectivity of the recording medium. This achieves the effect that the control loop gain in control circuits of the pick-up is no longer adversely influenced by the degree of reflection of the recording medium. By this measure, the pick-up becomes a pick-up with adaptation, i.e. the pick-up is capable of adapting itself to different recording media. This is explained in more detail below with reference to an exemplary embodiment of an optical pick-up which is suitable both for the playback of information from a CD or MOD and for recording and playback with recording media which have both pits and magnetic domains.

It should be noted that not only the control loop gain in the laser control circuit is dependent on the degree of reflection of the recording medium, but also other control circuits of the pick-up, such as for example the servo control circuits, are influenced by the degree of reflection of the recording medium with regard to their control loop gain.. In the case of an optical recording medium, the reflectivity influences the amplitude of the detected signals and consequently has an influence on the control loop gain. With the said means, influence can also be brought to bear on this in an advantageous way, so that the invention is not restricted to a laser control circuit. In principle, the invention can be used in all types of recording and playback machines in which a recording or pick-up power is used for the recording or playback of information.

The invention is explained in more detail below with reference to drawings, in which:

DETAILED DESCRIPTION

Figure 1:
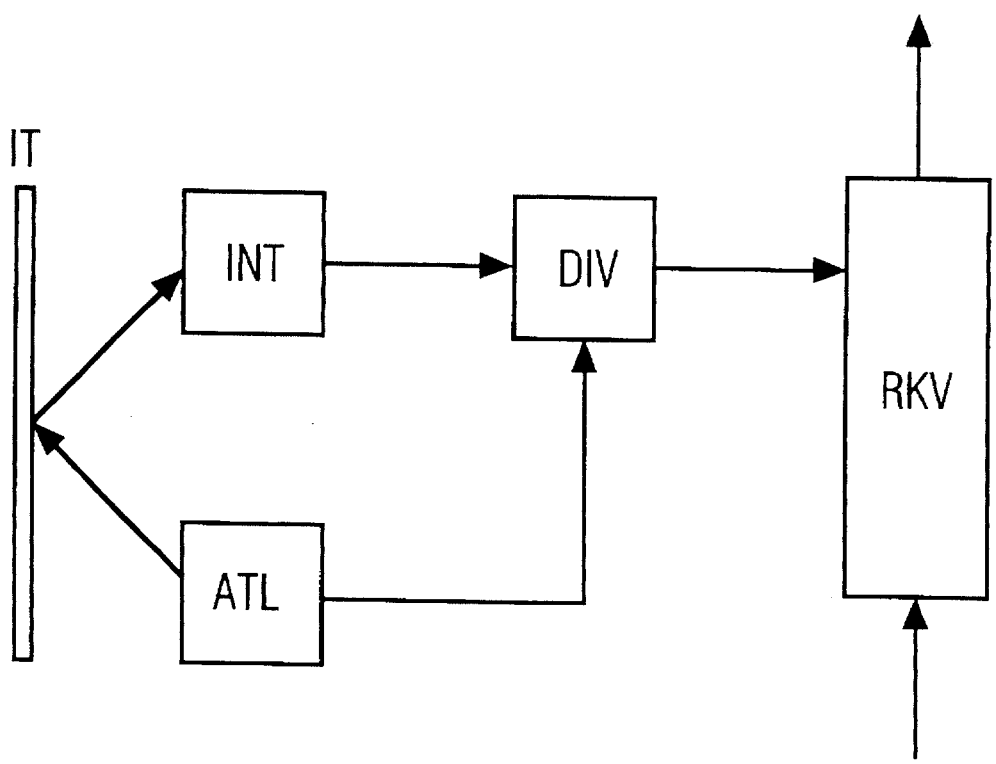
FIG. 1 is a circuit diagram of the adaptive pick-up apparatus.

To explain the invention, in FIG. 1 there is indicated a basic circuit diagram, which shows a recording or information medium IT, a device ATL for providing pick-up power, a device INT for detecting signals recovered from the recording medium IT, a divider DIV and a control loop amplifier RKV, adjustable with respect to its gain. For realizing a pick-up with adaptation or for adaptation of the recording and/or playback machine to the recording medium IT, there is provided a means for detecting the ratio of the intensity of a recording medium signal to the pick-up power expended, by which ratio the control loop gain is influenced. The means for detecting the ratio is preferably formed by a divider DIV and the intensity of the information carrier signal is established by the device INT for detecting signals obtained from the recording medium IT. The device ATL for providing pick-up power has a terminal connected to the divider DIV, which terminal provides a signal corresponding to the pick-up or recording power expended. The divider DIV is used to form a ratio of the intensity reflected from the recording medium IT to the pick-up power expended. In the case of an optical recording medium IT, this ratio is a measure of the reflectivity or the degree of reflection of the recording medium. Since recording media have different reflection properties, due to the method of manufacture, caused by aging or soiling, the quality of the recording media IT used can consequently be established and one or more control circuits can be influenced with regard to their control loop gain. An adaptation of the recording or playback machine to the recording media IT is performed. This advantageously achieves the effect that differing properties of recording carriers IT no longer have an adverse effect on the playback or recording of information.

As shown with reference to an embodiment which follows, this is possible in pick-up apparatus suitable for the recording and playback of information by recording media IT on which the information or data are stored both in pits and in magnetic domains. For this purpose, in FIG. 2 there is indicated a circuit block diagram of an optical pick-up with adaptation. An optical pick-up for the simultaneous reading of data or information of a specific recording medium 5, on which the information is stored both in pits and in magnetic domains, is already known from German Offenlegungsschrift 3,732,874. The specific recording medium 5 is a so-called ROM-RAM disk. The optical pick-up is, however, also suitable for reading recording medium 5 on which information or data are stored exclusively in pits or exclusively in magnetic domains. According to FIG. 2, which supplements FIG. 1 of German Offenlegungsschrift 3,732,874 by the addition of means for adaptation, a data pick-up light beam from a light source 1, which is usually a laser, is focused via a lens 2, a prism beam splitter 3 and a further lens 4 onto the specific recording medium 5, which reflects the light beam via the lens 4 back to the prism beam splitter 3. The reflected light beam is directed by the prism beam splitter 3 at right angles onto a prism beam splitter 6, which directs the light beam via a half-wave plate 7 to a polarization beam splitter 8. In the polarization beam splitter 8, the light beam is then directed via a lens 9 onto a first photodetector 11 if its polarization plane is turned in the one direction. On the other hand, the light beam is directed by the polarization beam splitter 8 via a lens 10 to a second photodetector 17 if its polarization plane is turned in the other direction. The photovoltage of the first photodetector 11 is fed to the first input of a summation amplifier 21 and to the subtraction input of a differential amplifier 20. The photovoltage of the second photodetector 17 is fed to the input of the summation amplifier 21 and to the addition input of the differential amplifier 20. The output of the summation amplifier 21 is connected via an amplitude- and phase-compensating network 22 to the input of a modulator 23, which controls the light power of the laser 1.

Because the pits are formed as depressions on the specific recording medium 5, the intensity of the reflected light fluctuates constantly and is superimposed as interference on the data signal at the output of the differential amplifier 20. To avoid this superimposition, the intensity of the reflected light is kept relatively-constant by means of the modulator 23, which drives the laser 1.

Therefore, the data signal MS, which represents the data stored in the magnetic domains of the specific recording medium, can be picked up at the output of the differential amplifier 20. The data contained in the pits are nevertheless not lost, since they are contained in the control signal of the modulator 23. Therefore, the data signal PS, which represents the data contained in the pits, can be picked up simultaneously at the output of the modulator 23. In this control circuit, by which the intensity of the light reflected by-the specific recording medium 5 is controlled by the modulator 23 to a constant value, the reflectivity or the degree of reflection of the recording medium 5 influences the control loop gain and consequently the stability of the control circuit 20.

Since recording media always have different reflection properties, due to the method of manufacture, caused by aging or soiling, the control loop gain varies according to the recording medium being used at a given instant. Consequently, good quality control is required of the recording media in order to ensure that the reflectivity varies within narrow limits. As practice has repeatedly shown, however, these quality requirements are frequently not met, with the result that such recording media can not be used, can not be used reliably or can not be used with the expected quality in pick-ups. The pick-up and not the recording medium is frequently misdiagnosed as the cause of the inadequate quality. In order to eliminate this disadvantage and also to enable use of recording media of lesser quality in pick-ups reliably, and with an optimum result, a pick-up with adaptation is proposed. In order to develop the optical pick-up known from German Offenlegungsschrift 3,732,874 into a pick-up with adaptation, in a way corresponding to FIG. 2, a capacitor C is provided in the connection of the summation amplifier 21 to the amplitude- and phase-compensating network 22, a dividing module 24 and a control loop gain adjuster 25 are arranged, and an output of the laser monitor 26 is connected to the dividing module 24. In order to form a ratio between the light intensity reflected by the recording carrier 5 and the laser power emitted by the pick-up, inputs of the dividing module 24 are connected to the already mentioned laser monitor 26 and to the output of the summation amplifier 21. The output of the dividing module 24, which provides a signal corresponding to the reflectivity of the recording carrier 5, is connected, for influencing the control loop gain, to the control loop gain adjuster 25, which is inserted between the amplitude- and phase-compensating network 22 and the modulator 23. This control loop gain adjuster 25 may be, for example, a gain controlled amplifier, or else a divider. It need not necessarily be arranged between the amplitude- and phase-compensating network 22 and the modulator 23, but may be inserted at any desired point in the chain between capacitor C and the laser 1. The capacitor C, which was inserted between the output of the summation amplifier 21 and the input of the amplitude- and phase-compensating network 22, serves in particular for d.c. component isolation, and the control loop gain is set reciprocally or inversely proportionally to the reflectivity of the recording media 5 by the control loop gain adjuster 25, so that, in spite of different recording media, there is a constant control loop gain at all times in the control circuit, and this is achieved although the signal is itself subject to fluctuations caused by the pits.

Figure 2:
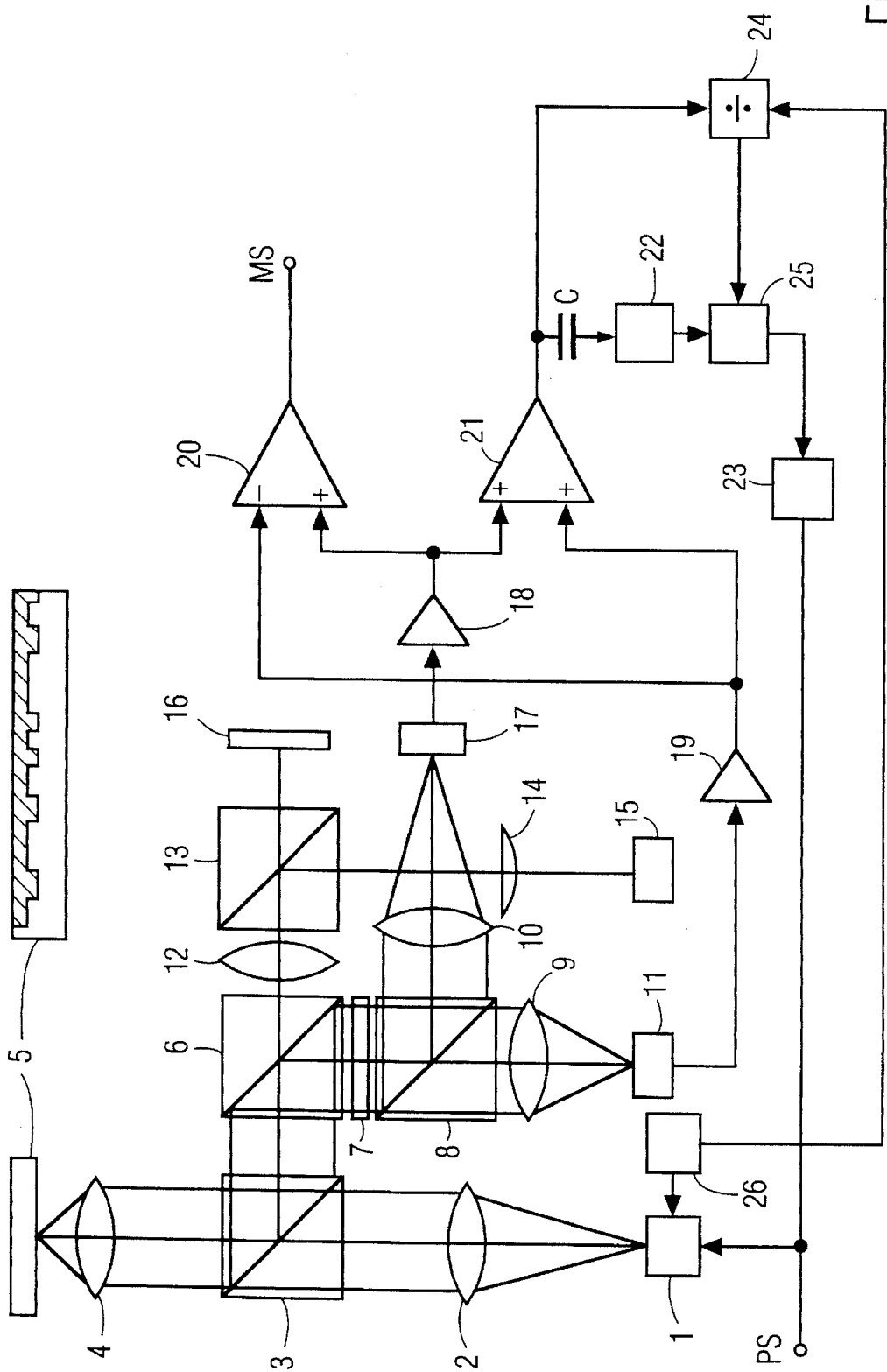
FIG. 2 is a block circuit diagram of an optical pick-up with adaptative laser control.

For the sake of completeness, also shown in FIG. 2 are a focusing photodetector 15 and a tracking photodetector 16 as component parts of servocontrolled circuits. As already mentioned, different recording media 5 influence the respective control loop gain in these control circuits as well. Here too, the proposed adaptation process may be used advantageously by forming a ratio between the intensity received by the recording medium and the laser power expended, by which ratio the control loop gain is then set. For this purpose, it is not necessary, however, to provide for a second time the means provided with regard to the laser control circuit for adaptation, since the signal already generated by the dividing module 24, which characterizes the reflectivity of the recording medium, can likewise be used for influencing the control loop gain in the servo control circuits. In principle, no separate adjustable control loop amplifier RKV or control loop gain adjuster 25 is required either if there is in the control circuit to be provided with adaptive properties already an adjusting capability for the control loop gain, which can then be used in an advantageous way. FIG. 2 also includes a lens 12, a beam splitter 13 and a cylindrical lens 14, which are provided as optical means for supplying the photodetectors 15, 16. The modules 18, 19 are current-voltage converters, which are provided in order to prepare the signals of the photodetectors 11, 17 for further processing.

It should be emphasized once again that the invention is not restricted just to the designs specified here, but in principle can be used for the adaptation of all types of pick-ups to the recording medium and in a plurality of control circuits simultaneously, the term pick-up used here including both 20 recording machines and playback machines.

What is claimed is:

1. Apparatus for recovering information from a recording medium by directing energy to and detecting reflected energy from said recording medium, said apparatus comprising:

a controllable source for controlling energy directed to the recording medium;

detection circuitry for providing a control signal corresponding to a ratio of energy directed to and energy reflected from said recording medium, said control signal being applied to said controllable source.

2. The apparatus set forth in claim 1 wherein said detection circuitry includes:

a detector for detecting the intensity of energy reflected from said recording medium to provide a first detection signal; and means for determining the intensity of energy directed from said controllable source to said recording medium to provide a second detection signal.

3. The apparatus set forth in claim 2 wherein said detection circuitry further includes a divider for dividing one of said first and second detection signals by the other of said first and second detection signals to provide said control signal.

4. The apparatus set forth in claim 3 wherein said controllable source includes a laser for providing said energy directed to the recording medium and a gain controlled amplifier, responsive to said control signal for providing power to said laser.

5. The apparatus set forth in claim 4 wherein said detector comprises a plurality of photo detectors and means for combining detected signals from said plurality of photo detectors.

6. The apparatus set forth in claim. 4 wherein said means for determining the intensity of energy directed to said recording medium comprises a laser monitor.

7. The apparatus set forth in claim 1 wherein said controllable source includes a laser for providing said energy directed to the recording medium and a gain controlled amplifier, responsive to said control signal for providing power to said laser.

8. A method of controlling the energy emitted by a laser in a disc playback system comprising:

measuring an intensity of light emitted by said laser onto a disc recording medium;

measuring an intensity of laser light reflected by said disc medium;

forming a ratio of values of measured emitted and reflected light;

modulating the intensity of light emitted by said laser in accordance with said ratio to maintain the intensity of light emitted by said laser substantially constant.

* * * * *